(12) United States Patent
Breuer et al.

(10) Patent No.: US 8,634,303 B2
(45) Date of Patent: Jan. 21, 2014

(54) EFFICIENT RADIO RESOURCE MANAGEMENT IN A MOBILE RADIO COMMUNICATION SYSTEM

(75) Inventors: Volker Breuer, Bötzow (DE); Thomas Ulrich, Bad Dürkheim (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 849 days.

(21) Appl. No.: 12/308,740

(22) PCT Filed: Jun. 18, 2007

(86) PCT No.: PCT/EP2007/056015
§ 371 (c)(1),
(2), (4) Date: May 21, 2009

(87) PCT Pub. No.: WO2007/147802
PCT Pub. Date: Dec. 27, 2007

(65) Prior Publication Data
US 2009/0262690 A1     Oct. 22, 2009

(30) Foreign Application Priority Data
Jun. 20, 2006 (EP) .................................. 06012659

(51) Int. Cl.
*H04J 1/16* (2006.01)

(52) U.S. Cl.
USPC .......................................... 370/241; 370/343

(58) Field of Classification Search
None
See application file for complete search history.

(56) References Cited

U.S. PATENT DOCUMENTS

| | | | | |
|---|---|---|---|---|
| 6,070,084 A | * | 5/2000 | Hamabe | 455/522 |
| 2004/0242231 A1 | * | 12/2004 | Tang et al. | 455/434 |
| 2005/0148368 A1 | * | 7/2005 | Scheinert et al. | 455/561 |
| 2005/0152312 A1 | * | 7/2005 | Marinier et al. | 370/332 |
| 2009/0233646 A1 | * | 9/2009 | Cyzs et al. | 455/562.1 |

FOREIGN PATENT DOCUMENTS

| | | |
|---|---|---|
| DE | 103 38 053 | 3/2005 |
| EP | 0902551 | 3/1999 |
| RU | 2 150 794 C1 | 6/2000 |
| WO | 96/31077 | 10/1996 |
| WO | 2005/020613 | 3/2005 |

OTHER PUBLICATIONS

3GPP TR 25.814 V1.2.0; Feb. 2006; pp. 1-64. URL: http://www.3gpp.org/ftp/specs/html-info/25814.htm.
Indian Office Action for related Indian Patent Application No. 2678/MUMNP/2008, issued Aug. 7, 2013, 2 pages.

* cited by examiner

*Primary Examiner* — Kevin C Harper
(74) *Attorney, Agent, or Firm* — Staas & Halsey LLP

(57) ABSTRACT

In a method for operating a radio communication system, network radio stations and subscriber stations communicate using a frequency band which is split into a plurality of subbands. A first network radio station receives from a second network radio station first information relating to transmission powers used by the second network radio station for at least some of the subbands. The first network radio station also receives from a subscriber station second information relating to a reception level for the subscriber station for at least one signal emitted by the second network radio station on a subband. A network radio station carries out the method.

20 Claims, 2 Drawing Sheets

EFFICIENT RADIO RESOURCE MANAGEMENT IN A MOBILE RADIO COMMUNICATION SYSTEM

CROSS REFERENCE TO RELATED APPLICATIONS

This application is based on and hereby claims priority to European Application No. EP06012659 filed on Jun. 20, 2006 and International PCT Application No. PCT/EP2007/056015 filed on Jun. 18, 2007, the contents of which are hereby incorporated by reference.

BACKGROUND OF THE INVENTION

The invention relates to a method for operating a radio communication system in which a frequency band split into a plurality of sub-bands is used for communication between network radio stations and subscriber stations.

In radio communication systems, messages, for example with voice information, image information, video information, SMS (Short Message Service), MMS (Multimedia Messaging Service) or other data are transmitted with the aid of electromagnetic waves via a radio interface between transmitting and receiving station. In this context, the stations can be various types of subscriber stations or network radio stations such as repeaters, radio access points or base stations depending on the actual design of the radio communication system. In a mobile radio communication system, at least some of the subscriber stations are mobile radio stations. The electromagnetic waves are radiated with carrier frequencies which are in the frequency band provided for the respective system.

Current mobile radio communication systems are often constructed as cellular systems, e.g. according to the GSM (Global System for Mobile Communication) or UMTS (Universal Mobile Telecommunications System) standard with a network infrastructure including e.g. of base stations, facilities for monitoring and controlling the base stations and other network facilities. Apart from these cellular, hierarchic radio networks organized over a wide space (supralocal), there are wireless local area networks (WLANs) with a radio coverage area which, as a rule, is much more limited in space. Examples of various standards for WLANs are HiperLAN, DECT, IEEE 802.11, Bluetooth and WATM.

The access of subscriber stations to the common transmission medium is regulated by multiple access methods/multiplex methods (MA) in radio communication systems. In these multiple accesses, the transmission medium can be split between the subscriber stations in the time domain (Time Division Multiple Access, TDMA, in the frequency domain (Frequency Division Multiple Access, FDMA), in the code domain (Code Division Multiple Access, CDMA) or in the space domain (Space Division Multiple Access, SDMA). Combinations of multiple access methods are also possible such as e.g. the combination of a frequency division multiple access method with a code division multiple access method.

To achieve the most efficient transmission of data possible, the entire available frequency band can be split into several sub-bands (multicarrier method). The concept forming the basis of the multicarrier systems is to transfer the initial problem of transmitting a wide-band signal into the transmission of several narrow-band signals. Among other things, this has the advantage that the complexity required at the receiver can be reduced. Furthermore, dividing the available bandwidth into several narrow-band sub-bands provides for distinctly greater granularity of the data transmission with regard to the distribution of the data to be transmitted between the different sub-bands, i.e. the radio resources can be distributed to the data to be transmitted or to the subscriber stations, respectively, with great fineness. An example of a multicarrier transmission method is OFDM (Orthogonal Frequency Division Multiplexing), in which pulse shapes which are approximately rectangular in time are used for the sub-bands. The frequency spacing of the sub-bands is selected in such a manner that in the frequency space for the frequency at which the signal of a sub-band is evaluated, the signals of the other sub-bands have a zero transition. The sub-bands are thus orthogonal to one another.

SUMMARY

One potential object is demonstrating an efficient method for operating a multicarrier radio communication system, and a network radio station suitable for carrying out the method.

The inventors propose a method for operating a radio communication system, a frequency band split into a plurality of sub-bands is used for the communication between network radio stations and subscriber stations. A first network radio station receives from a second network radio station first information which relates to transmission powers used by the second network radio station for at least some of the sub-bands. Furthermore, the first network radio station receives from a subscriber station second information which relates to a reception level of the subscriber station of at least one signal radiated the second network radio station on a sub-band.

The first network radio station receives the first information from the second network radio station. The first information is a transmission power spectrum. This transmission power spectrum can extend over the entire frequency band or only over a section of the entire frequency band; it can also specify only the transmission powers of single sub-bands of the entire frequency band. The first information is transmitted from the second network radio station to the first network radio station via a link, which can be provided by cable or radio; it is preferably a direct link which does not pass through routing or message-processing facilities.

The first network radio station receives the second information from the subscriber station. The second information is transmitted from the subscriber station to the first network radio station via a radio link. The second information relates to a level at which the subscriber station receives a signal of the second network radio station. The second information can be used to specify reception levels of several signals which are in each case radiated on a sub-band by the second network radio station. The signal or signals of the second network radio station is or are preferably pilot signals which are radiated at least also for the purpose of reception level measurements by the subscriber station.

The first and the second information are received by the first network radio station preferably whilst the subscriber station is communicating with the first network radio station.

As a development, the first network radio station requests the first information from the second network radio station and/or the second information from the subscriber station. In this arrangement, a request message can in each case specify the requested information by specifying e.g. sub-bands and/or times to which the requested first and/or second information is to relate.

The first information and the second information preferably relate at least partially to the same sub-bands. It is possible, e.g., that the sub-bands of the second information represent a subset of the sub-bands of the first information. The latter means that a respective information, relating to the transmission level from a second network radio station, is available to the first network radio station for all sub-bands with respect to which said first network radio station is informed about the reception level by the subscriber station.

As an embodiment, the first information also relates to a capacity utilization of the second network radio station. The signaling of the capacity utilization of the second network radio station to the first network radio station can be carried out explicitly in that the second network radio station transmits a quantity specifying its capacity utilization, or implicitly in that the first information is arranged with respect to the transmission power in such a manner that the first network radio station can determine from it a capacity utilization of the second network radio station. The information relating to the capacity utilization and the information relating to the transmission power can be transmitted in a common message or by separate messages.

It is also possible that the first information also relates to radio resources used by the second network radio station for radiating the at least one signal. This information relating to the radio resources and the information relating to the transmission power, and possibly also the information relating to the capacity utilization of the second network radio station, can be transmitted in a common message or by separate messages. The first network radio station can use the information relating to the radio resources, transmitted by the second network radio station, for informing the subscriber station on which radio resources the signals to be measured by said subscriber station with respect to the reception level are transmitted.

As a development, the first network radio station determines from the first and the second information a radio channel quality of at last one radio channel between the subscriber station and the second network radio station. In this context, the radio channel quality preferably relates to the at least one sub-band to which the reception level of the second information is related. Additionally or as an alternative, it is possible that the radio channel quality relates to at least one sub-band to which the reception level of the second information is not related; the first network radio station can thus obtain information about the radio channel quality of sub-bands for which the subscriber station does not provide it with any information relating to the reception level of signals of the second network radio station.

According to a preferred development, the first network radio station takes into consideration the first and the second information in a decision with respect to the assignment of a radio resource to the subscriber station. This assignment is carried out for a communication between the first network radio station and the subscriber station. In this context, it can be taken into consideration that sub-bands having little interference caused by a communication of the second network radio station are assigned.

As an embodiment, the first network radio station takes into consideration the first and the second information in a decision with respect to a handover of the subscriber station from the first to the second network radio station. This can be a concluding decision about carrying out a handover which relates to the first network radio station. However, it can also be a decision of the first network radio station to interrogate the second network radio station about a possible execution of a handover.

As a development, the first information and/or the second information relate to a plurality of times. In particular, the first information and/or the second information can relate to periodically recurring times. The first and/or the second information can be sent in individual messages which contain transmission power information or reception level information of only one time or in a message which contains several sets of transmission power information items or reception level information items corresponding to several times.

It is particularly advantageous if the first information and/or the second information are/is processed by using an image compression method. This processing is effected by the transmitter, i.e. by the second network radio station or by the subscriber station. After receiving the first and/or the second information, the first network radio station can apply the corresponding decompression method. Using an image compression method has the advantage of saving transmission resources.

The first information and/or the second information can also be processed by using a compression method in which interpolation points and at least one quantity describing a curve shape between the interpolation points are used. The interpolation points are particular sub-bands. With respect to the first information, the at least one quantity describing the curve shape describes the variation of the transmission power plotted against the sub-bands, and with respect to the second information, the at least one quantity describing the curve shape describes the variation of the reception level plotted against the sub-bands.

The network radio station according to the invention communicates with subscriber stations by using a frequency band split into a plurality of sub-bands. It furthermore receives and processes first information from another network radio station which relates to transmission powers used by the other network radio station for at least some of the sub-bands, and receives and processes second information from a subscriber station which relates to a reception level of the subscriber station of at least one signal radiated by the other network radio station on a sub-band.

The network radio station according to the invention is particularly suitable for carrying out the method according to the invention, which can also apply to the embodiments and developments.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
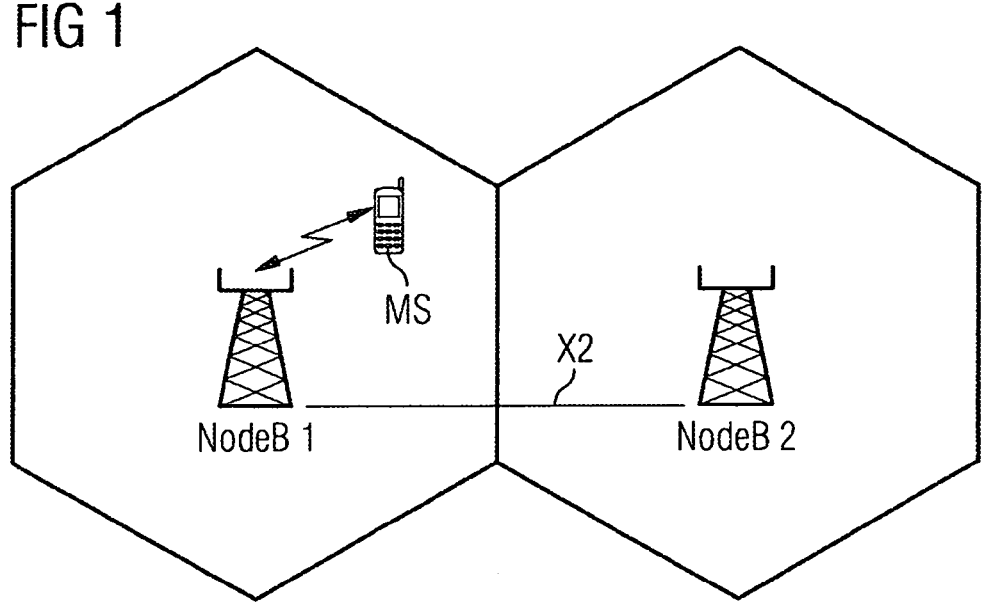
FIG. 1: shows a section of a mobile radio communication system.

Reference will now be made in detail to the preferred embodiments of the present invention, examples of which are illustrated in the accompanying drawings, wherein like reference numerals refer to like elements throughout.

The section of a mobile radio communication system, shown in FIG. 1, shows the radio cells of the two adjacent network radio stations nodeB 1 and nodeB 2. The two network radio stations nodeB 1 and nodeB 2 can communicate with one another via an interface designated by X2. The interface X2 is preferably implemented by a line; it is furthermore preferably a direct connection, i.e. a connection without interposition of a server or a switching device. The subscriber station MS is located in the radio cell of the network radio station nodeB 1. Other network facilities and subscriber stations of the mobile radio communication system are not shown in FIG. 1 for reasons of clarity. The mobile radio communication system considered can be, e.g., a system according to a development of UMTS, designated as LTE (Long Term Evolution).

The subscriber station MS communicates currently with the network radio station nodeB 1. This can be a communication in the downlink, i.e. message transmissions from the network radio station nodeB 1 to the subscriber station MS, and/or a communication in the uplink, i.e. message transmissions from the subscriber station MS to the network radio station nodeB 1. In the system considered, a wide frequency band is assumed to be available for communication between subscriber stations and network radio stations, which is divided into a plurality of sub-bands. Accordingly, a multi-carrier technology such as, e.g., OFDM is used. The communication between the network radio station nodeB 1 and the subscriber station MS can take place on some or all sub-bands of the frequency band. E.g., the subscriber station MS can be designed in such a manner that it can only receive signals on a limited bandwidth, this bandwidth being distinctly smaller than the width of the entire frequency band; in this case, the subscriber station MS can only utilize a section of the bandwidth available in the system at any one time.

Figure 2:
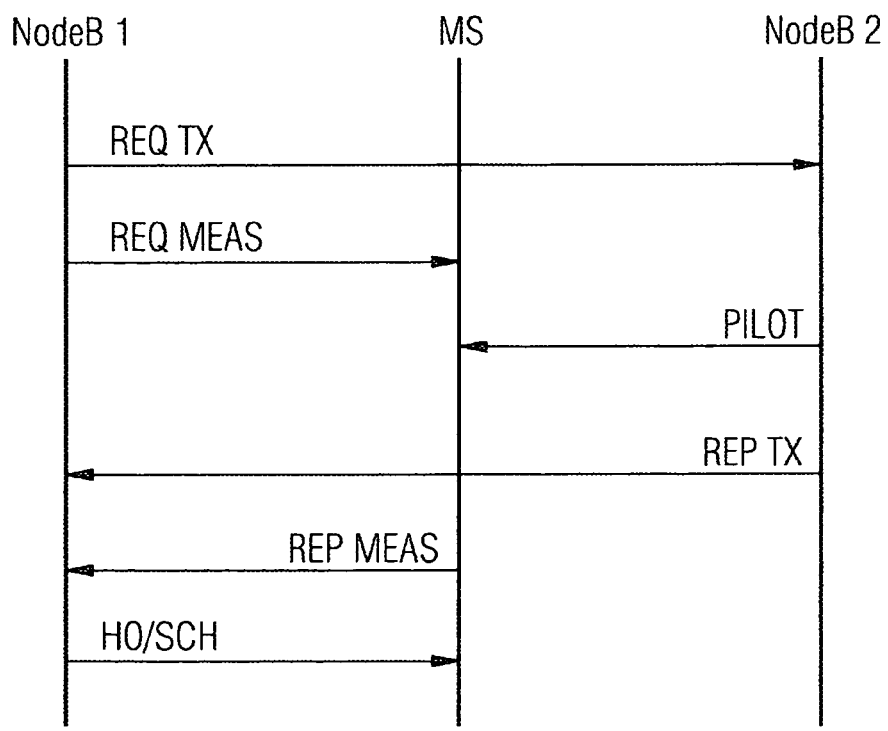
FIG. 2: shows a flowchart.

Since the network radio station nodeB 1 is currently responsible for the subscriber station MS, the network radio station nodeB 1 provides for a suitable supply of radio resources for the subscriber station MS as will be shown by the flowchart of FIG. 2 in the text which follows. This flowchart shows an exchange of messages between the network radio stations nodeB 1 and nodeB 2, and an exchange of messages between the network radio station nodeB 1 and the subscriber station MS. In the text which follows, the exchange of messages between the network radio stations nodeB 1 and nodeB 2 will be explained first.

The network radio station nodeB 1 sends a request message REQ TX to the network radio station nodeB 2 with the order to provide it with information relating to the radio communication of the network radio station nodeB 2. This is the following information:

The transmission powers used by the network radio station nodeB 2 for the sub-bands of the frequency band. Such a transmission power spectrum is shown FIG. 3A. Towards the top, the transmission power 11 of the network radio station nodeB 2 is plotted here and towards the right the sub-bands SB are plotted. By way of example, only 11 sub-bands SB are considered in FIG. 3A. Real systems often use a much higher number of sub-bands. The transmission power values 11 requested or provided as a response by the network radio station nodeB 2 can here relate to transmission powers used in a particular direction of radiation, preferably in the direction of the position of the subscriber station MS. Furthermore, the request of the network radio station nodeB 1 or the response of the network radio station nodeB 2, respectively, can relate to the transmission powers 11 of the network radio station nodeB 2 of only some of the sub-bands of the frequency band or of sub-bands of a section of the frequency band.

In addition, the request message REQ TX can relate to the following information:

A quantity describing the capacity utilization of the network radio station nodeB 2. This can be e.g. an information item about the percentage in which the radio resources available to the network radio station nodeB 2 are currently occupied or the transmission power which is used for certain channels such as channels for pilot signals PILOT or broadcast channels which have a fixed relationship to the maximum transmission power.

The information about as to which sub-bands and at which times the network radio station nodeB 2 is radiating pilot signals PILOT. This information is not necessary if the time and frequency position of the pilot signals PILOT of the network radio station nodeB 2 is known to the network radio station nodeB 1. The pilot signals PILOT are signals known to the subscriber station MS which can be used for performing measurements by the subscriber station MS as described in the text which follows.

The network radio station nodeB 2 answers the request REQ TX of the network radio station nodeB 1 with the response message REP TX by providing the requested information to the network radio station nodeB 1. The response message REP TX of the network radio station nodeB 2 thus specifies at least the transmission power spectrum and possibly information relating to the capacity utilization and/or relating to the radio resources used for radiating the pilot signals PIOT. In this context, the information provided to the network radio station nodeB 1 by the network radio station nodeB 2 can relate to the current situation or also to a future one, known to the network radio station nodeB 2 or predicted by it. E.g., the response REP TX can relate to the situation in a few ms with respect to the time of the radiation of the response message REP TX.

The time to which the information of the response message REP TX is related is known to the network radio stations nodeB 1 and nodeB 2. This can be implemented by the response message REP TX specifying this time, e.g. by referring to a timing pattern. In addition, or as an alternative, the network radio station nodeB 1 can possibly inform the network radio station nodeB 2 with the request message REQ TX about the time to which the requested information should relate. It is possible that the network radio station nodeB 1 requests multiple provision of the information by the request REQ TX. Thus, it is possible, for example, that the network radio station nodeB 2 should send the requested responses REP TX periodically to the network radio station nodeB 1.

While the subscriber station MS currently communicates with the network radio station nodeB 1, it is in the vicinity of the radio cell of the network radio station nodeB 2 so that it can also receive signals of the network radio station nodeB 2 in addition to signals of the network radio station nodeB 1. This can lead to unwanted interference and thus to an impairment of the communication between the network radio station nodeB 1 and the subscriber station MS. In particular, the subscriber station MS can also receive, and recognize as such, pilot signals PILOT radiated by the network radio station nodeB 2. The network radio station nodeB 1 requests the subscriber station MS with the request message REQ MEAS to perform measurements of the reception level relating to pilot signals PILOT of the network radio station nodeB 2 and to inform the network radio station nodeB 1 of the results. In this connection, the network radio station nodeB 1 can specify in the request message REQ MEAS a frequency range in which the subscriber station MS is to search for the pilot signals of the network radio station nodeB 2. As an alternative, certain sub-bands on which the network radio station nodeB 2 radiates pilot signals PILOT which are to be measured by the subscriber station MS can be predetermined by the request message REQ MEAS. Such a subset of sub-bands can include sub-bands distributed uniformly in the frequency band, e.g., of each tenth sub-band, or can be concentrated to a certain section of the frequency band. The latter is advantageous, e.g., if the network radio station nodeB 1 intends to continue its communication with the subscriber station MS in a certain frequency section and, for this purpose, is interested in the magnitude of the interference in this frequency section.

In the request REQ MEAS, the network radio station nodeB 1 can specify a certain time at which the measurements of the subscriber station MS are to be carried out. Several such times can also be specified. Carrying out the measurements periodically is advantageous, in particular. Furthermore, it is possible that the performance of the measurements is made dependent on the occurrence of a particular event.

The subscriber station MS responds to the request REQ MEAS of the network radio station nodeB 1 with one or more response messages REP MEAS. This contains or these contain reception level values with respect to those sub-bands which are specified by the network radio station nodeB 1 in the request REQ MEAS. FIG. 3B shows such a reception power spectrum. The reception level 12 is here plotted towards the top and the sub-bands SB towards the right, the case that measurements have been performed on only two sub-bands SB being represented as an actual example.

If the network radio station nodeB 1 requests the performance of measurements on a multiplicity of sub-bands from the subscriber station MS, the transmission of the measurement results from the subscriber station MS to the network radio station nodeB 1 requires a large amount of radio resources. For example, it is possible that the network radio station nodeB 1 requests measurements by the subscriber station MS on all sub-bands or at least on all sub-bands within a section of the frequency band. To save radio resources for this transmission, the use of compression methods for the data containing the measurement results is advantageous.

For this purpose, methods known, in particular, from the field of image compression such as the compression standards jpeg, gif, mpeg are available. In this context, the frequency resolution can be restricted to the width of one sub-band. For purposes of compression, use can be made of the fact that, due to the coherence width, adjacent sub-bands have a similar characteristic. A further possibility for the data reduction, i.e. for compressing the data containing the measurement results, is conveying measurement results only for certain sub-bands, the so-called interpolation points. These interpolation points can be fixed, i.e. they are preselected and are known to the radio station nodeB 1 and the subscriber station MS. As an alternative, the position of the interpolation points can also be variable so that the selected interpolation points can differ from one transmission of measurement results to the next transmission of measurement results. In addition to the measurement results of the interpolation points, variation-describing quantities relating to the variation of the measurement result curve plotted against the sub-bands are also transmitted. Available variation-describing quantities are, e.g., the first and the second derivation. These forms of data reduction can be called spline interpolation (for predetermined interpolation points) or Bezier curves (for variable interpolation points).

Such compression methods can also be used in the transmission of the transmission power spectrum from the network radio station nodeB 2 to the network radio station nodeB 1.

Figure 3A:
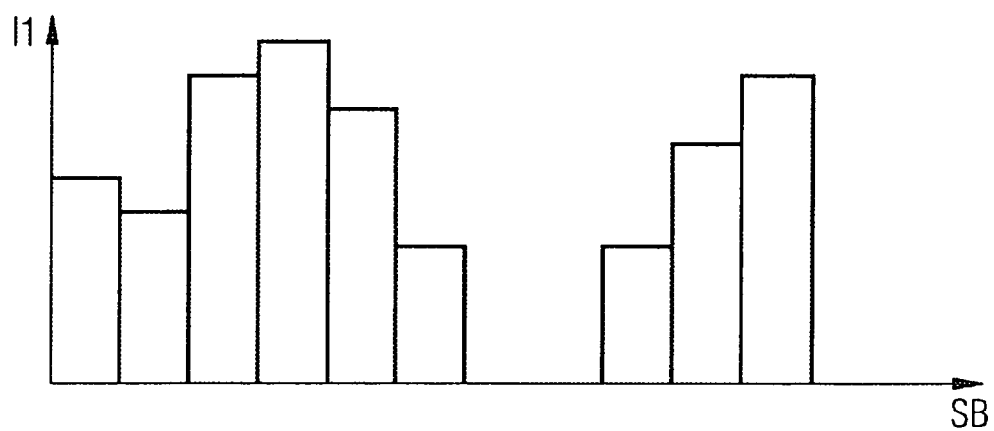
FIG. 3A: shows a transmission power spectrum.
Figure 3B:
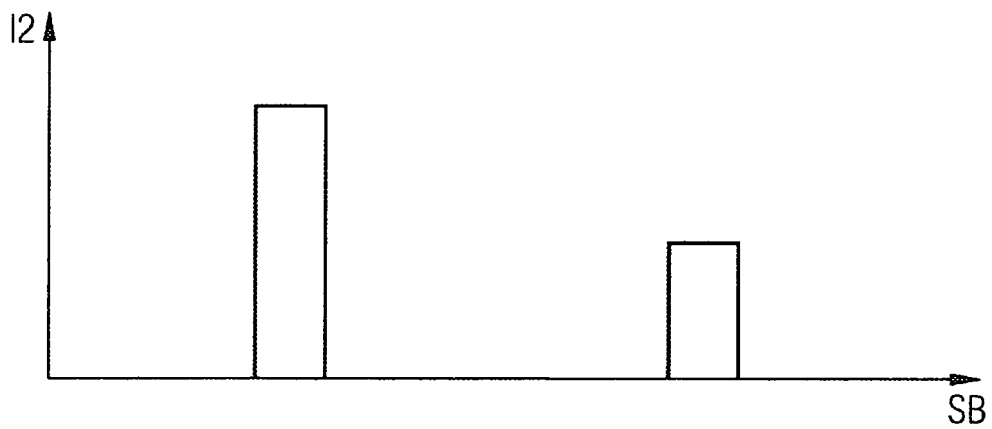
FIG. 3B: shows a reception power spectrum.

The network radio station nodeB 1 thus receives a transmission power spectrum, e.g. according to FIG. 3A, from the network radio station nodeB 2 and a reception power spectrum, e.g. according to FIG. 3B, from the subscriber station MS. In this context, the time at which the network radio station nodeB 2 radiates the transmission power spectrum reported to the network radio station nodeB 1 with the response message REP TX and the time at which the subscriber station MS receives the reception power spectrum reported to the network radio station nodeB 1 with the response message REP MEAS are about the same. This can be achieved by suitable specifications of the times in the request messages REQ TX and REQ MEAS. It is thus known to the network radio station nodeB 1 with respect to at least some pilot signals PILOT of the network radio station nodeB 2 with what transmission power 11 the network radio station nodeB 2 radiates these and with what reception power 12 the subscriber station MS receives these. The network radio station nodeB 1 can therefore calculate the radio channel attenuation with respect to the radio channels between the network radio station nodeB 2 and the subscriber station MS for these sub-bands. If several REP TX messages and/or several REP MEAS messages have been sent, averaging can be performed as part of the calculation.

The network radio station nodeB 1 can determine by calculation the channel impulse response for those sub-bands for which the subscriber station MS has not performed any measurements, using as interpolation points the radio channel attenuations, known to it from the measurements, of the sub-bands containing the measured pilot signals PILOT. This assumes that the coherence width is greater than the width of one sub-band, i.e. the sub-bands do not behave independently of one another with respect to their channel attenuation. If, for example, one sub-band is next to a sub-band having a strong channel attenuation, it must be assumed that a poor radio channel quality also exists for this adjacent sub-band. From the measurements of the subscriber station MS with respect to certain sub-bands, this makes it possible to draw conclusions for the characteristics of radio channels with respect to which no measurement results of the subscriber station MS are known to the network radio station nodeB 1. The network radio station nodeB 1 thus has information about the radio channel quality between the network radio station nodeB 2 and the subscriber station in the entire frequency band, or at least in a section of the frequency band depending on what range of the frequency band the response messages REP TX and REP MEAS are related to.

The knowledge obtained by the network radio station nodeB 1 about the radio channels between the subscriber station MS and the network radio station nodeB 2 can be used by the network radio station nodeB 1 as follows:

There can be efficient scheduling, i.e. assignment of a radio resource to the subscriber station MS for the communication between the network radio station nodeB 1 and the subscriber station MS. This can take into consideration that sub-bands or frequency ranges for which there is a good channel quality between the subscriber station MS and the network radio station nodeB 2 are not used for communication between the network radio station nodeB 1 and the subscriber station MS and should thus not be assigned to the subscriber station MS. This is because communication between the network radio station nodeB 1 and the subscriber station MS would experience great interference on the sub-bands due to message transmissions within the radio cell of the network radio station nodeB 2. To enhance the transmission quality, the network radio station nodeB 1 thus assigns sub-bands, with respect to which a poor radio channel quality was found between the subscriber station MS and the network radio station nodeB 2, to the subscriber station MS. By reducing the interference, the transmission rate can be increased in the communication between the subscriber station MS and the network radio station nodeB 1, e.g. on the basis of a lower number of packets not received or defectively received and thus to be transmitted again. This procedure is particularly relevant to subscriber stations which, like the subscriber station MS in FIG. 1, are located in the vicinity of the boundary between various radio cells.

A sound decision can be made about a handover of the subscriber station MS from the network radio station nodeB 1 to the network radio station nodeB 2. If the network radio station nodeB 1 finds that the radio channel quality of the radio channels between the subscriber station MS and the network radio station nodeB 2 is better than that of the radio channels between the subscriber station MS and the network radio station nodeB 1 in one or more frequency ranges, it would be advantageous if the subscriber station MS were to continue the communication currently carried out with the network radio station nodeB 1 with the network radio station nodeB 2 as radio communication partner. As has been explained also with respect to the scheduling, this procedure is particularly relevant for subscriber stations which, like the subscriber station MS in FIG. 1, are located in the vicinity of the boundary between various radio cells and thus represent potential handover candidates.

The decision about whether a handover to the network radio station nodeB 2 is to be carried out can additionally or as an alternative to the criterion of channel quality also include that of capacity utilization of the network radio station nodeB 2. For this purpose, the explicit information about the capacity utilization of the network radio station nodeB 2 possibly contained in the response message REP TX can be used. If the network radio station nodeB 2, for example, reports with the response message REP TX that it is highly utilized, it can be assumed that a handover request by the network radio station nodeB 2 would be rejected. As an alternative or additionally, the network radio station nodeB 1 can see from the transmission power spectrum of the network radio station nodeB 2 whether a handover to the network radio station nodeB 2 would be appropriate. If, for example, it can be seen from the transmission power spectrum that there are unused sub-bands, the network radio station nodeB 2 could use these for communication with the subscriber station MS. Or if an integration of the transmission power spectrum over the frequency results in a low overall utilization of the network radio station nodeB 2, a decision in favor of a handover to the network radio station nodeB 2 could be made.

The subscriber station MS is informed about the decision made by the network radio station nodeB 1 with the message HO/SCH, e.g. by assigning to it new radio resources or by informing it about impending handover to the network radio station nodeB 2. If the network radio station nodeB 1 decided in favor of a handover to the network radio station nodeB 2, this is coordinated, not shown in FIG. 2, between the network radio stations nodeB 1 and nodeB 2.

The method described can be used with respect to several subscriber stations. It must be taken into consideration here that different subscriber stations must send their response messages REP MEAS to the network radio station nodeB 1 on different radio resources so that the response messages REP MEAS of different subscriber stations do not interfere with one another. To keep the demand for radio resources in the uplink for the transmission of the measurement results by the subscriber stations within limits, it makes sense to specify only a few sub-bands for the subscriber stations on which they are to perform measurements of the pilot signals. In contrast, it is not necessary to send the response message REP TX out several times to the network radio station nodeB 2 for the purpose of determining radio channels of different subscriber stations because different subscriber stations can carry out their measurements on the same signals PILOT.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v DIRECTV*, 69 USPQ2d 1865 (Fed. Cir. 2004).

The invention claimed is:

1. A method of operating a radio communication system, comprising:
splitting a frequency band into a plurality of sub-bands, the frequency band being used for communication between a plurality of network radio stations and a plurality of subscriber stations;
receiving at a first network radio station of the network radio stations from a second network radio station of the network radio stations first information identifying a transmission power used by the second network radio station to radiate a transmit signal over at least one sub-band; and
receiving at the first network radio station from a subscriber station second information identifying a reception level of the subscriber station of the transmit signal radiated by the second network radio station over the at least one sub-band.

2. The method as claimed in claim 1, wherein the first network radio station requests the first information from the second network radio station and/or requests the second information from the subscriber station.

3. The method as claimed in claim 1, wherein the first information (REP TX) additionally relates to a capacity utilization of the second network radio station.

4. The method as claimed in claim 1, wherein the first information additionally relates to radio resources used by the second network radio station to radiate the at least one signal.

5. The method as claimed in claim 1, further comprising determining, at the first network radio station, from the first information and the second information a radio channel quality of at least one radio channel between the subscriber station and the second network radio station.

6. The method as claimed in claim 5, wherein the radio channel quality relates to the at least one sub-band to which the reception level of the second information is related.

7. The method as claimed in claim 5, wherein the radio channel quality relates to at least one sub-band to which the reception level of the second information is not related.

8. The method as claimed in claim 1, wherein the first network radio station takes into consideration the first information and the second information in a decision with respect to the assignment of a radio resource to the subscriber station (MS).

9. The method as claimed in claim 1, wherein the first network radio station takes into consideration the first information and the second information in a decision with respect to a handover of the subscriber station from the first network radio station to the second network radio station.

10. The method as claimed in claim 1, wherein the first information and/or the second information relate to a plurality of times.

11. The method as claimed in claim 1, wherein the first information and/or the second information are processed by using an image compression method.

12. The method as claimed in claim 1, wherein the first information and/or the second information are processed by using a compression method in which interpolation points and at least one quantity describing a curve shape between the interpolation points are used.

13. The method as claimed in claim 2, wherein the first information and the second information relate at least partially to the same sub-bands.

14. The method as claimed in claim 13, wherein the first information (REP TX) additionally relates to a capacity utilization of the second network radio station.

15. The method as claimed in claim 14, wherein the first information additionally relates to radio resources used by the second network radio station to radiate the at least one signal.

16. The method as claimed in claim 15, further comprising determining, at the first network radio station, from the first information and the second information a radio channel quality of at least one radio channel between the subscriber station and the second network radio station.

17. A network radio station, comprising:
 means for communicating with subscriber stations by using a frequency band split into a plurality of sub-bands;
 means for receiving and processing first information from another network radio station identifying a transmission power used by the other network radio station to radiate a transmit signal over at lease one sub-band; and
 means for receiving and processing second information from a subscriber station identifying a reception level of the subscriber station of the transmit signal radiated by the other network radio station over the at least one sub-band.

18. A radio communications system, comprising:
 a first network radio station;
 a second network radio station transmitting first information identifying a transmission power used by the second network radio station to radiate a transmit signal over at least one sub-band split from a frequency band used for communication between the first network radio station and the second network radio station, to the first network radio station; and
 a subscriber station transmitting second information identifying a reception level of the subscriber station of the transmit signal radiated by the second network radio station over the at least one sub-band, to the first network radio station,
 wherein the first network radio station calculates a radio channel quality of at least one radio channel between the second network radio station and the subscriber station.

19. The method as claimed in claim 1, wherein both the first and second network radio stations are nodeB base stations that communicate wirelessly with respective subscriber mobile stations.

20. The method as claimed in claim 1, wherein the first network radio station receives from the second network radio station information identifying a transmission power spectrum used by the second network radio station over the frequency band.

* * * * *